J. T. MURPHY.
ATTACHMENT FOR BABY CARRIAGES.
APPLICATION FILED APR. 29, 1912.
1,039,993.
Patented Oct. 1, 1912.
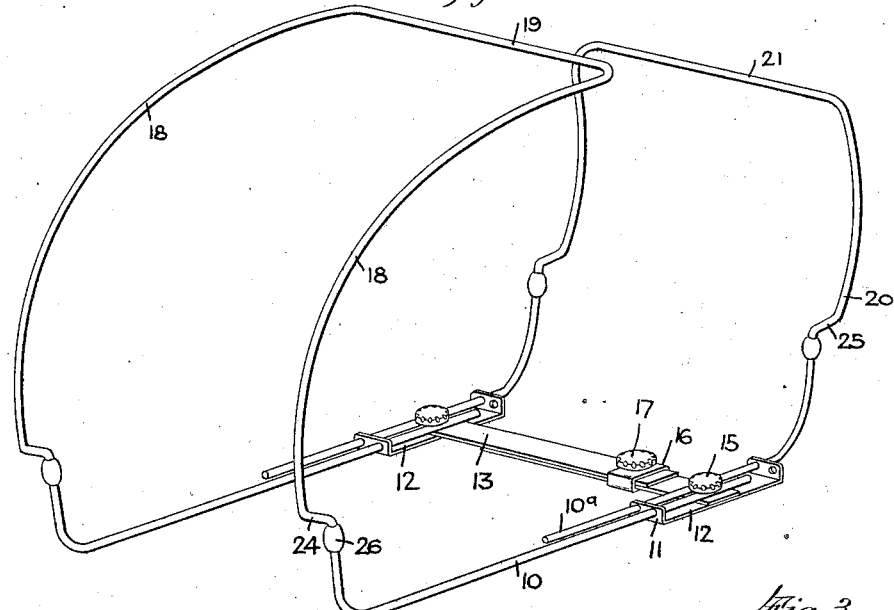
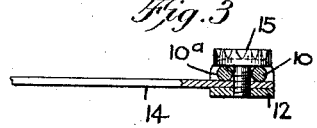
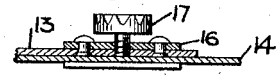
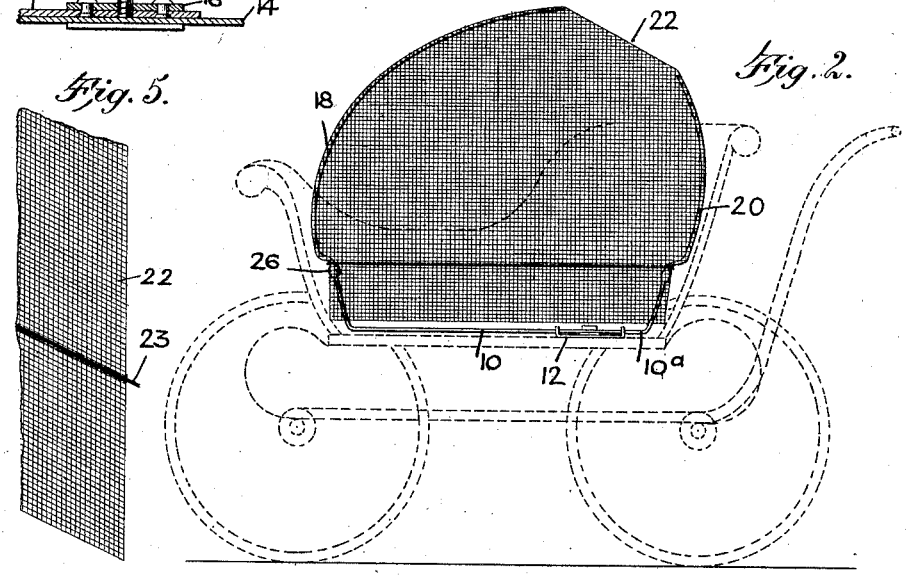
WITNESSES
INVENTOR
John T. Murphy
BY
ATTORNEYS

UNITED STATES PATENT OFFICE.

JOHN T. MURPHY, OF NEW YORK, N. Y.

ATTACHMENT FOR BABY-CARRIAGES.

1,039,993.  Specification of Letters Patent.  Patented Oct. 1, 1912.

Application filed April 29, 1912. Serial No. 693,801.

*To all whom it may concern:*

Be it known that I, JOHN T. MURPHY, a citizen of the United States, and a resident of the city of New York, borough of Brooklyn, in the county of Kings and State of New York, have invented a new and Improved Attachment for Baby-Carriages, of which the following is a full, clear, and exact description.

My invention relates to an attachment to support a canopy or mosquito netting, and adapted to be fitted to any carriage within the limits of adjustment of the attachment.

Provision is made for adjusting the device both as to length and width, in accordance with the size of the carriage body with which it is to be used.

The invention comprises a bottom frame having side bars and a cross bar, and upwardly extending end members that curve inwardly toward each other and overhanging at the top, the one end member overhanging to a greater degree than the other. The end members comprise side bars and an integral cross bar.

The invention will be more particularly described in connection with the specific description hereinafter to be given.

Reference is to be had to the accompanying drawings forming a part of this specification, in which similar characters of reference indicate corresponding parts in all the views.

Figure 1 is a perspective view of the attachment; Fig. 2 is a side elevation thereof, with the mosquito netting in place, a carriage being indicated in dotted lines; Fig. 3 is a detail view, the section being taken transversely through one of the side bars of the bottom frame; Fig. 4 is a longitudinal section taken through the cross bar of the bottom frame, and Fig. 5 is a fragmentary detail of the mosquito canopy.

The side bars of the bottom frame comprise slidably connected members 10, 10ª, which overlap at their adjacent ends and pass through holes in vertical flanges 11 formed on a longitudinal coupling plate 12. The cross bar of the bottom frame comprises the overlapped sliding plates 13, 14, that extend inwardly from and are rigidly secured to the coupling plates 12 of the side bars of the bottom frame. Binding screws 15 take into the ends of the cross bars 13, 14, and the clamping plates 12, and are adapted to clamp the members 10 and 10ª of the side bars between the under side of the heads of the screws 15 and the upper surface of the members 13, 14 of the bottom cross bar. It will be understood that any suitable means may be provided for clamping the members 10 and 10ª in adjusted position, and that the device as illustrated and described simply constitutes one means for accomplishing the purpose. The overlapped ends of the members 13, 14 of the bottom cross bar pass through a sleeve or keeper 16, in which a screw 17 takes, and is adapted to bind the members 13, 14 and the ring 16 in adjusted position.

The end frames of my improved device are preferably formed as follows: One end frame is formed of side bars 18 which are united by an integral cross bar 19, and the arms 18 curve inwardly so as to overhang at the top and form a substantial support for a mosquito netting or equivalent canopy. The opposite end frame is similarly formed, and comprises side bars 20, and an integral cross bar 21, the side bars extending inwardly in the opposite direction to the arms 18 of the other end frame. The frame at one end overhangs to a greater degree than the other, so as to form an opening so located as to facilitate the placing and removal of the child. It is understood that cushions, carpet, and the like, are laid over the bottom frame, and serve to keep it in position until the child is placed in the carriage; the weight of the child maintains the attachment in position and prevents its displacement when securing or removing the canopy.

Either the shorter or the longer end frame may be disposed at the front of the carriage. In the example shown in Fig. 2, the longer frame is at the front, but this can be reversed in actual use, as the owner may desire. Over the support thus provided, a mosquito netting 22 is arranged, desirably in the form of a hood, and adjacent to the lower edge said netting is provided with an elastic cord 23, a draw string, or equivalent. Preferably the elastic cord is employed, and my improved support is specially made to receive the netting. Thus the arms 18 and 20, at points a short distance from the bottom frame, are provided with outward offsets 24, 25, to provide overhanging shoulders that arrest any tendency of the mosquito netting hood to rise and slip over the support. Advantageously also, the side arms 18, 20 of the end frame are formed with protuberances which may be blocks of rubber fitting tightly the respective arms immediately below the offset overhanging portions 24, 25. With end frames formed as described, the elastic cord, or equivalent, extends around the arms beneath the overhanging offsets thereof, and above the protuberances 26.

It will be seen that the side arms 10, 10ª may be adjusted lengthwise to suit the length of the baby carriage body, and similarly the bars 13, 14 may be quickly adjusted to adapt the adjustment to the width of the carriage. It will be understood that in the transverse adjustment, the arms 18 yield and may be sprung outward or inward. The members 10 and 10ª in practice are preferably integral with the members 18 and 20, and are formed of spring wire.

Having thus described my invention, I claim as new and desire to secure by Letters Patent:

1. An attachment for baby carriages, comprising a bottom frame adjustable longitudinally and transversely, and comprising side bars and a cross bar, end frames integral with the side frames and consisting of side bars and cross bars, the said end frames curving toward each other to overhang at the top, and one end frame being of greater length than the other and thus overhanging to a greater degree, the end frames being formed with outwardly extending offset portions a distance above the bottom frames and having protuberances adjacent to said offsets, and a canopy formed of netting in the shape of a hood and having a retaining strand extending around the hood near the bottom to engage the end frames between the offset portions and the protuberances.

2. A canopy support for baby carriages, comprising a bottom frame and end frames that overhang the bottom at the upper ends; the bottom frame comprising overlapping members and means for adjusting the said members, and a cross bar comprising slidably connected members.

3. An attachment for baby carriages, comprising a bottom frame and end frames, the bottom frame being adjustable longitudinally and transversely to suit carriage bodies of different sizes, and the end frames extending at the top toward each other, the inner ends of the said end frames being spaced apart.

4. A canopy support for baby carriages, comprising a bottom frame adjustable longitudinally and transversely, and end frames integral with the side bars of the bottom frame and comprising upwardly and inwardly extending side bars and top cross bars, said end frames being formed of spring wire and yielding to the transverse adjustment of the bottom frame.

5. An attachment for baby carriages, comprising a bottom frame comprising side bars and a cross bar, said side bars each consisting of overlapping members and a coupling plate, said plate having vertical flanges through which the overlapped end members pass, a binding screw for holding said members against the plate, the said cross bar comprising overlapped sliding members, means for holding said members in adjusted position; end frames integral with the overlapping members of the side bars of the bottom frame and extending inwardly to overhang at the top, the end frame being formed of spring wire and having outwardly extending offset portions between the top and bottom, and a canopy in the form of a hood having an elastic cord near the bottom, said hood fitting the end frames and the elastic strand engaging said frames below the offset portions thereof.

In testimony whereof, I have signed my name to this specification in the presence of two subscribing witnesses.

JOHN T. MURPHY.

Witnesses:
MATTHEW McBRIDE,
THOMAS F. NEWMAN.

Copies of this patent may be obtained for five cents each, by addressing the "Commissioner of Patents, Washington, D. C."